United States Patent [19]

King et al.

[11] 4,330,659

[45] May 18, 1982

[54] MODIFIED AMINE HARDENER SYSTEMS

[75] Inventors: John J. King, East Haven, Conn.; Ralph F. Sellers, Somerset, N.J.; Richard N. Castonguay, Danbury, Conn.

[73] Assignee: Ciba-Geigy Corporation, Ardsley, N.Y.

[21] Appl. No.: 267,117

[22] Filed: May 26, 1981

Related U.S. Application Data

[63] Continuation-in-part of Ser. No. 194,094, Oct. 6, 1980, abandoned.

[51] Int. Cl.$^3$ ............................................. C08G 59/50
[52] U.S. Cl. ..................................... 528/99; 528/103; 528/109; 525/504; 564/325
[58] Field of Search ................... 564/325; 528/99, 103, 528/109; 525/504

[56] References Cited

U.S. PATENT DOCUMENTS 2,909,448  10/1959  Schroeder ........................ 528/109 X
3,155,743  11/1964  Newey ............................. 528/109 X

*Primary Examiner*—Earl A. Nielsen
*Attorney, Agent, or Firm*—Harry Falber

[57] ABSTRACT

A resinous hardener system comprising the reaction product of diamino diphenylsulfone compounds and diglycidyl ethers of polyhydric phenols. The hardener system can be incorporated into a variety of epoxy resins for use as improved prepreg or laminating resins, as resin molded castings, and the like.

11 Claims, No Drawings

MODIFIED AMINE HARDENER SYSTEMS

This application is a continuation-in-part of application Ser. No. 194,094, filed Oct. 6, 1980, now abandoned.

Adducts from amines and mono- and diepoxides have long been used in industry as curing agents for epoxy resins. The advantages of the formation of such adducts include lower volatility, lower irritation potential, reduced tendency to blush and exude, and the like. Such adducts are discussed in Lee and Neville, Handbook of Epoxy Resins, McGraw Hill (1967).

Such systems have frequently been used within the aerospace industry. A primary area of use has been in epoxy resins which are utilized to pre-impregnate various fibers for eventual use as honeycomb skins. These various laminates are utilized in aerospace construction. The currently, most widely used epoxy system for pre-pregging and laminating is based upon tetraglycidylated methylene dianiline and a diaminodiphenylsulfone hardener. While these systems have shown to advantage, they also have exhibited a number of meaningful disadvantages. These disadvantages stem primarily from the hardener's incompatibility with the resin and the difficulty of dissolving it in the epoxy resin. Among the specific processing disadvantages are included:

1. the need for high temperatures in order to get the hardener into solution without the need for extraneous solvents;
2. the undesirable advancement of the hardener with the epoxy, usually requiring that other resins be added to increase the drape and tack which, in turn, usually lowers the melt viscosity;
3. the need for heat to remove any solvents which may be used, thereby resulting in some advancement; and
4. the difficulty of achieving and controlling the desired flow causing variations of the prepreg within the same batch.

Although the resulting systems are operable and can be successfully laminated, they too exhibit a number of disadvantages including:

1. They have a high modulus and are brittle.
2. They are moisture sensitive to some extent.
3. Reproducibility in the production of low—or no—bleed systems is difficult to achieve.
4. It is difficult to prepare honeycomb core composites with these systems due to their poor flow characteristics which allow for bleeding of the resin into the core thereby causing void spaces in the skins.

It is the primary object of this invention to provide a modified hardener system for epoxy resins.

It is a further object to provide such a hardener system which improves upon the performance of diamino diphenylsulfone hardeners.

It is another object to utilize such hardener systems with a wide variety of epoxy resins to provide prepreg or laminating resins of improved performance characteristics.

Various other objects and advantages of this invention will become apparent from the following descriptive material and illustrative examples.

It has now been surprisingly discovered that by reacting the diamino diphenylsulfone with a diglycidyl ether of a polyhydric phenol the processing characteristics of the hardener system and the performance characteristics of the epoxy resin cured therewith are dramatically enhanced without adversely effecting, in a substantial way, the other desired properties. The latter characteristics are particularly evident when the modified hardener is utilized in conjunction with tetraglycidylated methylene dianiline. Improved compatibility with the resin and increased melt viscosity resulting in a controllable flow are noted. The resulting systems can be laminated or used in skins on honeycombs and exhibit improved impact resistance, toughness, strength and water resistance.

More specifically, the improved processing parameters include:

1. Increased compatibility of the hardener with the epoxy resin. The hardener solubilizes at lower temperatures, reducing the chance of an undesired advancement. The chance of incomplete dissolution or mixing is similarly reduced.
2. The melt viscosity of the system may be controlled by the molecular weight of the hardener. This eliminates the necessity for difficult-to-control advancement steps in the preparation of the resin system.
3. The use of resin additives will still function in obtaining good drape and tack.
4. The advancement of the resin on the prepreg is easier to control due to the reduced need for advancement.
5. The modified hardener allows reproducible production of no—or low—bleed prepregs for use with or without honeycomb.

In addition, the resins cured with the instant hardener systems exhibit the following improved properties:

1. Such systems are readily laminated.
2. They are tougher and have higher impact strength than the conventionally hardened systems.
3. They exhibit added mechanical strength.
4. They xhibit an increased humidity resistance.
5. They have a higher melt flow viscosity.
6. The instant systems are also vastly superior to rubber-modified systems.

As a result of these delineated characteristics, the modified hardener system lends itself for use in primary composite structures, an area of application in which the existing systems have not been able to perform effectively. The modified hardener system is also available for use with a broad range of difunctional and multifunctional epoxy resins for use in a wide area of applications such as coatings, molded castings, adhesives and filament wound structures.

The modified hardener system is prepared by adducting the epoxy resin with the diamino diphenylsulfone compound. The applicable diamino diphenylsulfones correspond to the formula

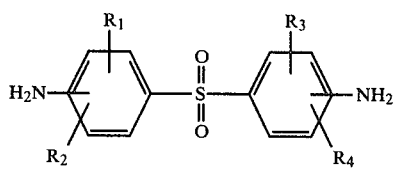

wherein $R_1$, $R_2$, $R_3$ and $R_4$ are independently hydrogen, straight and branched chain alkyl of 1 to 12 carbon atoms, preferably 1 to 4 carbon atoms, or halogen. Commercially available sulfones include the 2,4'-, 3,3'- and 4,4'-diamino diphenylsulfones. Although diamino diphenylsulfones are preferred for purposes of this invention, other aromatic polyamines or aralkyl polyamines can be utilized for the preparation of the instant adducts.

The applicable epoxy resins are diglycidyl ethers of polyhydric phenols. Among such materials are diglycidyl ethers of bisphenols corresponding to the formula

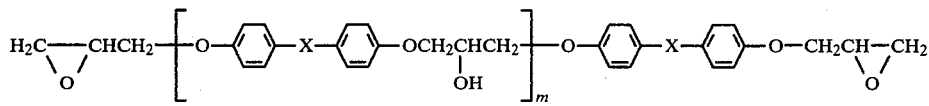

wherein m is 0–50 and X is —CH$_2$—,

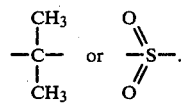

These represent, respectively, bisphenols F, A and S. Other applicable ethers include the diglycidyl ethers of resorcinol, catechol, hydroquinone, and the like. The various ethers may be substituted on the respective phenyl rings by such non-reactive substituents as alkyl, halogen, and the like.

The general procedure for preparing the modified hardener involves forming a solution of the diglycidyl ether in an appropriate solvent, admixing the sulfone, and heating the resulting mixture at a temperature of about 130°–180° C. until completion of the reaction. Completion will generally take 2–6 hours and may be monitored by analytical procedures, completeness being indicated by the disappearance of the epoxy function. Solvent removal is generally effected by evaporation during further processing. Applicable solvents include ketones, aromatic hydrocarbons such as toluene, and the like. In some instances, the solvent may be omitted depending on the nature of the component blend.

It may be desirable to prepare the resin in-situ by co-reacting the diglycidyl ether with additional polyhydric phenol. In this instance, small amounts of an appropriate catalyst such as alkali metal hydroxides, tertiary amines, quaternary amines, and the like may be utilized.

Concentrations of the sulfone are selected so as to achieve a modified hardener system having from about 2.5 to 100 equivalents of aminohydrogen per equivalent of epoxy. These values are selected into order to avoid gelling at levels lower than those specified and reduced physical properties at levels higher than those specified.

As previously noted, the modified hardener systems can be processed with a wide variety of epoxy resins. Included among such resins are epoxide resins based on polyhydric phenols such as those based on bisphenol A, F, and S, epoxidation products of cresol novolacs, and epoxidation products of phenol novolacs; hydantoin epoxide resins; polyglycidyl esters; glycidylated aromatic amines; glycidylated aminophenols; and certain cycloaliphatic epoxy resins. Tetraglycidylated methylene dianiline is preferred for purposes of the instant invention. In addition, in adhesive, coating and filament winding applications, resin based on the diglycidyl ether of bisphenol A is widely used. The modified hardener is utilized in stoichiometric amounts ±50% relative to the epoxy resin, with 85% of stoichiometry being preferred.

Techniques for preparing prepregs are well known to those skilled in the art. In terms of honeycomb skins, graphite, glass, Kevlar reinforced skins as well as others, can be readily prepared from the instant systems. Correspondingly, techniques for preparing laminates are well known. Such laminates may be prepared by compression or autoclave molding and may comprise a broad range of thicknesses.

Apart from the above areas of utility, the adducts of this invention are useful as curing agents for a wide variety of epoxy resins in various heat cured applications. When combined with di- and polyepoxides, at generally stoichiometric amounts, and cured at elevated temperatures, a network of high crosslink density occurs. Accordingly, the expression "cure" as used herein, denotes the conversion of the above adducts and epoxide material into insoluble and infusible crosslinked products, with simultaneous shaping to give shaped articles such as castings, pressings or laminates, or to give two-dimensional structures such as coatings, enamels or adhesive bonds. The modified hardener system is particularly advantageous for the formation of coatings because of the improved compatibility with resins and the improved toughness of the resulting cured coatings.

The adducts prepared according to the invention and admixed with other polyepoxide compounds can furthermore be mixed, at any stage before cure, with usual modifiers such as extenders, fillers and reinforcing agents, pigments, dyestuffs, organic solvents, plasticizers, tackifiers, rubbers, accelerators, diluents, and the like. As extenders, reinforcing agents, fillers and pigments which can be employed in the curable mixtures according to the invention there may be mentioned, for example: coal tar, bitumen, glass fibers, boron fibers, carbon fibers, cellulose, polyethylene powder, polypropylene powder, mica, asbestos, quartz powder, gypsum, antimony trioxide, bentones, silica aerogel ("Aerosil"), lithopone, barite, titanium dioxide, carbon black, graphite, iron oxide, or metal powders such as aluminum powder or iron powder. It is also possible to add other usual additives, for example, flameproofing agents, agents for conferring thixotropy, flow control agents such as silicones, cellulose acetate butyrate, polyvinyl butyral, waxes, stearates and the like (which are in part also used as mold release agents) to the curable mixtures.

It is also possible in adhesive formulations, for example, to add rubbers such as carbonyl-terminated acrylonitrile-butadiene rubber, modifying resins such as triglycidyl p-aminophenol, accelerators such as boron trifluoride monoethylamine complexes or imidazole complexes, and other additional hardeners such as dicyandiamide.

The curable mixtures can be manufactured in the usual manner with the aid of known mixing equipment (stirrers, kneaders, rollers and the like).

The following examples will further illustrate the embodiments of the instant invention. In these examples, all parts given are by weight unless otherwise noted.

EXAMPLE I

The following example illustrates the preparation of typical modified hardeners of the instant invention.

|  | Hardener #1 | | Hardener #2 | |
| --- | --- | --- | --- | --- |
|  | Parts | | Parts | |
| Diglycidyl ether of bisphenol A[1] | 100.0 | 0.530 epoxy | 100.0 | 0.530 epoxy |
| Bisphenol A | 29.0 | 0.254 OH | 29.0 | 0.254 OH |
| 50% NaOH | 0.008 | | 0.008 | |
| After complete reaction | | 0.276 epoxy | | 0.276 epoxy |
| Methyl Ethyl ketone | 86.0 | | 86.0 | |
| Diamino diphenyl-sulfone | 160.0 | 2.581 NH | 129.0 | 2.081 NH |
| Theoretical yield | 289.0 | 2.305 NH | 258.0 | 1.805 NH |
| Calculated equivalent weight | 125 | | 143 | |

[1]ARALDITE 6010 from CIBA-GEIGY Corp.

The diglycidyl ether was charged into a vessel and heated to 100° C. Bisphenol A and NaOH were then added with the temperature maintained at 100° C. The pressure was reduced to about 100 mm Hg. and heat increased to 160° C. and maintained for 2–3 hours until the epoxy value reached 0.21–0.22 equivalents per 100 grams. Atmospheric reflux was switched to, the ketone added to dissolve the resin and the system cooled. Thereafter, the diaminodiphenylsulfone was added. The slurry was heated on distillation to 180° C. and the pressure again reduced to 100 mm Hg. The system was held at 180° C. for three additional hours at which point the molten product was discharged.

EXAMPLE II

|  | Hardener #3 | | Hardener #4 | |
| --- | --- | --- | --- | --- |
|  | Parts | | Parts | |
| 6010 | 100.0 | 0.530 epoxy | 100.0 | 0.530 epoxy |
| Bisphenol A | 51.8 | 0.454 OH | 51.8 | 0.454 OH |
| 50% NaOH | 0.008 | | 0.008 | |
| After complete reaction | | 0.076 epoxy | | 0.076 epoxy |
| Methyl isobutyl ketone | 50.0 | | 50.0 | |
| Methyl ethyl ketone | 51.2 | | 51.2 | |
| Diamino diphenyl-sulfone | 159.8 | 2.577 NH | 126.5 | 2.041 NH |
| Theoretical yield | 311.6 | 2.501 NH | 278.3 | 1.964 NH |
| Calculated equivalent weight | 125 | | 142 | |

The diglycidyl ether was charged into a vessel and heated to 115° C. Bisphenol A and NaOH were then added with the temperature maintained at 100° C. The pressure was reduced to about 100 mm Hg and heat increased to 190° C. and maintained at 190° C.–200° C. for three hours until the expoxy value reached 0.050 equivalents per 100 grams. Atmospheric reflux was switched to, the ketones added to dissolve the resin and the system cooled. Thereafter, the diaminodiphenylsulfone was added. The slurry was heated on distillation to 180° C.–185° C. and the pressure again reduced to 100 mm Hg. The system was held at 180° C.–185° C. for three additional hours at which point the molten product was discharged.

EXAMPLE III

The following examples are directed to the performance characteristics of the modified hardeners of Examples I and II and of the processed epoxy resin. Tetraglycidylated methylene dianiline (MY-720 from CIBA-GEIGY Corp.) was utilized in each instance. A control utilizing unmodified diamino diphenylsulfone hardener was included in the tests. All of the combinations were at an 85% stoichiometry of aminohydrogen to epoxy.

I. The physical properties of the four prepared modified hardeners and of the unmodified hardener are given below:

| HARDENER COMPONENT PROPERTIES | | | | | |
| --- | --- | --- | --- | --- | --- |
|  |  | Hardener | | | |
| Component | Control | #1 | #2 | #3 | #4 |
| Amino-hydrogen Equivalent Weight (g. equiv.) | 62 | 125 | 142 | 125 | 142 |
| Softening Point (°C.) | — | 105–110 | 105–110 | 105–110 | 105–110 |
| Melting point (°C.) | 170 | — | — | — | — |
| Solution viscosity 60% MEK (cst) | — | 275–370 | 400–625 | 885–1290 | 1290–1760 |

It should be noted that the average molecular weight of the modified hardeners increased from #1 to #4 as can be seen from the solution viscosities. It should be noted that all of the modified versions of the hardener had an improved solubility with the molten MY-720 while pure hardener was not as compatible.

II. Flow Characteristics:

Melt viscosities were determined for each of the five systems (Table 2) by placing a known amount of MY-720 into an aluminum dish and heating it to 150° C. To this, the required amount of hardener was added and thoroughly mixed for 142 seconds. The dish was removed from the heat and allowed to cool to room temperature.

Melt viscosities for the mixes were determined on a cone and plate viscometer (Research Equipment, London, Ltd.) at 150° C. The value obtained by this measurement is an initial viscosity at an elevated temperature which bears a relationship to the minimum viscosity obtained during the cure cycle. Tests comparing this cone and plate viscosity to a Rheometrics DMA minimum viscosity (2° C./min. heat-up) has shown a high positive correlation. The equation describing this relationship is, Equation (1):

$$\log[R] = 1.59 \log [B/4] - 1.43$$

$$r = 0.999$$

where:
  R = Rheometrics minimum viscosity, cps, for a 2° C./min. heat-up.
  B = Cone and plate viscosity, cps, at 150° C.

The table below describes the cone and plate viscosities at 150° C. for each of the five systems and the projected Rheometrics DMA minimum viscosity based upon Equation (1).

| CONE AND PLATE VISCOSITIES OF 150° C. AND PROJECTED RHEOMETRICS MINIMUM VISCOSITY | | |
|---|---|---|
| | Viscosity | |
| System | Cone & Plate at 150° C. (cps) | Projected Rheometrics DMA Viscosity (cps)* |
| Control | 320 | 40 |
| 1 | 1520 | 470 |
| 2 | 2600 | 1100 |
| 3 | 3500 | 1800 |
| 4 | 6600 | 4900 |

*Minimum viscosity obtained using a 2° C./min. heat rise.

This data is significant since there is a need within the Aerospace Industy for a "controlled flow" high performance resin system. Controlled flow may be defined as a higher minimum melt-flow viscosity during a fixed processing cycle. Such a property is advantageous for low or no bleed prepreg systems for use as honeycomb skins. The modified systems show varying degrees of melt viscosity increases or "controlled flow" depending upon the molecular weight distribution of the hardener. The data presented above demonstrates this effect with a melt-flow viscosity increase, in system #4, of more than 100 times that of the standard system.

III Pure Resin Characteristics:

Pure resin castings were prepared by carefully heating the MY-720 to 135° C. and slowly stirring in the powdered hardener until a clear mixture was obtained. The combined epoxy and hardener was degassed under a 30 in. Hg vacuum for twenty minutes at 135° C. in order to remove any air or dissolved gasses. The material was then poured into a sheet mold and cured. The cure schedule and epoxy/hardener proportions for the systems examined are given below.

| PURE RESIN SYSTEMS COMPONENTS AND CURE CYCLE | | | | | |
|---|---|---|---|---|---|
| | System | | | | |
| Component (pbw) | Control | 1 | 2 | 3 | 4 |
| MY-720 | 100 | 100 | 100 | 100 | 100 |
| Control | 44 | — | — | — | — |
| #1 | — | 85 | — | — | — |
| #2 | — | — | 100 | — | — |
| #3 | — | — | — | 85 | — |
| #4 | — | — | — | — | 100 |

Resin Cure:
2hr/80° C.
1hr/100° C.
4hr/150° C.
7hr/200° C.

Cured pure resin flexural and tensile data for the five systems were obtained at room temperature and 150° C. according to ASTM test methods D-790 and D-638, respectively. In addition, room temperature compressive properties were determined by ASTM D-695.

Heat deflection temperatures (HDT) for the resin systems were determined by ASTM D-648. Thermomechanical analysis (TMA) to determine the glass transition temperature (Tg) was carried out in the penetration mode with a heat-up of 10° C./min. and a 5 gram loading. These values are given below:

| PURE RESIN PHYSICAL PROPERTIES | | | | | |
|---|---|---|---|---|---|
| | System | | | | |
| Property | Control | #1 | #2 | #3 | #4 |
| Room Temperature: | | | | | |
| Tensile Strength(psi) | 8,540 | 9,230 | 6,970 | 12,160 | 11,500 |
| Tensile Modulus(psi) | 542,000 | 507,000 | 498,000 | 535,000 | 515,000 |
| Tensile Elongation(%) | 1.8 | 2.0 | 1.5 | 2.7 | 2.6 |
| Flexural Strength(psi) | 13,300 | 19,000 | 16,970 | 20,250 | 19,600 |
| Flexural Modulus(psi) | 499,000 | 500,000 | 469,000 | 534,000 | 508,000 |
| Compressive Strength(psi) | 34,000 | 29,300 | 30,500 | 33,300 | 36,000 |
| Compressive Yield(psi) | 29,200 | 26,400 | 25,600 | 24,300 | 23,700 |
| Compressive Modulus(psi) | 284,000 | 275,000 | 287,000 | 315,000 | 314,000 |
| 150° C.: | | | | | |
| Tensile Strength(psi) | 6,460 | 8,000 | 8,800 | 6,100 | 6,100 |
| Tensile Modulus(psi) | 378,000 | 342,000 | 358,000 | 189,000 | 179,000 |
| Tensile Elongation(%) | 1.9 | 3.9 | 3.6 | 5.9 | 6.0 |
| Flexural Strength(psi) | 12,300 | 13,400 | 13,300 | 9,000 | 9,000 |
| Flexural Modulus(psi) | 387,000 | 353,000 | 374,000 | 192,000 | 202,000 |
| Heat Deflection Temperature(C.°) | 238 | 201 | 204 | 200 | 199 |
| Glass Transition Temperature(C.°) | 177 | 192 | 180 | 174 | 175 |

The physical property data for the pure resin systems examined illustrate the significant property increases for room temperature flexural and tensile strengths that are obtained for the modified systems with some decrease in thermal capability as observed by HDT. Systems #3 and #4 have the best room temperature tensile properties while systems #1 and #2 show superior tensile properties at elevated temperatures. Flexural data indicated that all of the modified systems are stronger at room temperature than the control with systems #1 and #2 having the the best elevated temperature strengths of the modified versions. Compressive strengths and moduli for systems #1 through #4 are comparable to the control while the compressive yield shows a decrease, probably due to a reduction in the crosslink density. Overall, systems #3 and #4 demonstrate the best room temperature static mechanical properties, while systems #1 and #2 have the best elevated temperature properties.

Impact testing at room temperature was run on the pure resin systems by two methods. The first was an unnotched Charpy impact to determine the energy required to initiate and propagate a fracture. This test was run according to ASTM D-256 except that no notch was placed into the specimen. The second method was a modified Gardner impact where an unrestrained 1"×1"×⅛" specimen was fractured by a falling weight having a nose radius of ¼". The impact strength was measured as the force at which failure occurred. These values are recorded below along with the room temperature and 150° C. tensile elongations.

| IMPACT AND TENSILE ELONGATION OF THE PURE RESIN | | | | | |
|---|---|---|---|---|---|
| | System | | | | |
| Property | Control | 1 | 2 | 3 | 4 |
| Room Temperature: | | | | | |
| Modified Gardner (in-lb) | 7 | 7 | 6 | 12 | 8 |
| Unnotched Charpy (ft-lb/in$^2$) | 5.7 | 8.2 | 9.4 | 8.1 | 19.0 |
| Tensile Elongation(%) | 1.8 | 2.0 | 1.5 | 2.7 | 2.6 |
| 150° C.: | | | | | |

IMPACT AND TENSILE ELONGATION
OF THE PURE RESIN

| Property | Control | System 1 | 2 | 3 | 4 |
|---|---|---|---|---|---|
| Tensile Elongation(%) | 1.9 | 3.9 | 3.6 | 5.9 | 6.0 |

Depending upon how impact is measured, whether by tensile elongation, Charpy or a falling ball, the values obtained will vary because each test is measuring a different aspect of impact or toughness. All of the modified systems examined demonstrated increased impact and toughness, with systems #3 and #4 having the highest increases.

In order to obtain these increases in physical properties, some loss in HDT (load bearing capability at elevated temperatures) was incurred, but the glass transition temperature as measured by TMA is not changed for systems #3 and #4 and is even increased in systems #1 and 190 2.

Humidity testing was carried out on the pure resin systems at 80° C. and 95% relative humidity. The moisture pickup is shown below:

HUMIDITY AGING OF PURE RESIN
AGED UNTIL EQUILIBRIUM (25 DAYS) AT 80° C.
AND 100% RELATIVE HUMIDITY

| SYSTEM | % WEIGHT GAIN |
|---|---|
| CONTROL | 4.29 |
| 1 | 3.28 |
| 2 | 3.17 |
| 3 | 3.00 |
| 4 | 2.80 |

The modified systems demonstrate a definite improvement in moisture resistance.

Furthermore, it is noted from the following table that the desired properties are substantially maintained even after humidity aging.

EFFECTS OF HUMIDITY EXPOSURE AT
ROOM TEMPERATURE PURE RESIN
MECHANICAL PROPERTIES

| | CONTROL | 1 | 2 | 3 | 4 |
|---|---|---|---|---|---|
| % WEIGHT GAIN | 4.29 | 3.28 | 3.17 | 3.00 | 2.80 |
| HDT (°C.) | 141 | 148 | 133 | 117 | 110 |
| FLEX: | | | | | |
| STRENGTH (psi) | 13,700 | 13,900 | 16,600 | 15,500 | 19,300 |
| MODULUS (psi) | 499,800 | 488,300 | 477,900 | 489,400 | 500,500 |
| TENSILE | | | | | |
| STRENGTH (psi) | 3,900 | 5,400 | 4,600 | 6,500 | 8,700 |
| MODULUS (psi) | 446,700 | 445,800 | 434,800 | 476,100 | 465,500 |
| ELONGATION (%) | 0.9 | 1.2 | 1.1 | 1.4 | 2.1 |

A comparison of the above values with those presented in the table entitled "Pure Resin Physical Properties" reveals that the mechanical properties of the modified systems of the instant invention are less effected than those of the control. This property retention can thus be attributed to the increased moisture resistance of the instant systems.

IV. Composite Characteristics:

Unidirectional graphite prepreg was prepared from Thornel-300 graphite yarn (Grade WYP-30, finish UC-309, no twist). The yarn was passed through a 30–35% by weight solution of resin/hardener in MEK/Acetone (50/50) and would onto a drum winder yielding a tape with 20 tows/inch, 12 feet long and 18 inches wide. The prepreg was allowed to air dry one hour and was then staged for three minutes at 120° C. This gave a prepreg with acceptable drape and tack. The prepreg was cut, layed-up and cured by compression molding. The impregnating solutions and cure cycle are given below.

COMPOSITE IMPREGNATING SOLUTIONS
AND CURE CYCLE

| Component (pbw) | Control | System 1 | 2 | 3 | 4 |
|---|---|---|---|---|---|
| MY-720 | 100 | 100 | 100 | 100 | 100 |
| Control | 44 | — | — | — | — |
| #1 | — | 85 | — | — | — |
| #2 | — | — | 100 | — | — |
| #3 | — | — | — | 85 | — |
| #4 | — | — | — | — | 100 |
| MEK | 144 | 185 | 200 | 185 | 200 |
| Acetone | 144 | 185 | 200 | 185 | 200 |

Compression Molding Cure Cycle for Composites:
 (1) Room temperature to 176° C. @3° C./min.
 (2) Hold 90 minutes at 176° C. Apply 100 psi at the gel point (10–20 minutes into the hold)
 (3) Cool to room temperature
 (4) Post cure 4 hours at 205° C.

All of the laminates manufactured for test purposes were analyzed for void content by ASTM methods D-3171, D-2734 and D-792. All of the fabricated panels were found to have zero voids. The composite data presented has been corrected to a 30 weight percent resin content.

Twenty ply, 0° panels were prepared from each of the systems described above. From these laminates, short beam shear specimens were obtained and tested according to ASTM D-2344 at room temperature, −59° C., and 93° C. 0° flexural properties were obtained from 10 ply panels and tested by ASTM D-790 at room temperature, −59° C., and 93° C. Fourteen ply matrix tensiles, oriented at +45/90/−45/90 and tested in the 0° direction according to ASTM D-3039 at room temperature and −59° C., were used to measure the combined effects of shear and matrix strength. Short beam shear, flexural and matrix tensile data appear below.

PRELIMINARY COMPOSITE PROPERTIES

| Property | Control | System 1 | 2 | 3 | 4 |
|---|---|---|---|---|---|
| Short Beam Shear, 0° (ksi) | | | | | |
| −59° C. | 11.2 | 9.7 | 11.2 | 10.0 | 10.6 |
| room temperature | 10.5 | 10.5 | 10.5 | 9.5 | 12.0 |
| 93° C. | 9.4 | 9.1 | 9.1 | 8.2 | 11.5 |
| Flexural Strength, 0° (ksi) | | | | | |
| −59° C. | 209 | — | 263 | 263 | 240 |
| room temperature | 228 | 241 | 219 | 224 | 234 |
| 93° C. | 227 | — | 251 | 240 | 216 |
| Flexural Modulus, 0° (psi × 10$^6$) | | | | | |
| −59° C. | 13.2 | — | 15.4 | 14.1 | 16.2 |
| room temperature | 14.8 | 14.6 | 15.0 | 14.1 | 13.6 |
| 93° C. | 14.9 | — | 17.4 | 16.4 | 15.3 |
| Matrix Tensile Strength (ksi) | | | | | |
| −59° C. | 13.6 | 22.0 | 13.7 | 25.8 | 14.7 |
| room temperature | 14.7 | 24.0 | 16.2 | 30.0 | 14.6 |
| Matrix Tensile Modulus (ksi) | | | | | |
| −59° C. | 498 | 385 | 390 | 521 | 453 |

-continued

| Property | Control | System 1 | 2 | 3 | 4 |
|---|---|---|---|---|---|
| room temperature Matrix Tensile Elongation (%) | 539 | 424 | 425 | 594 | 319 |
| −59° C. | 4.3 | 5.6 | 4.5 | 5.6 | 5.0 |
| room temperature | 3.5 | 6.1 | 5.2 | 5.3 | 5.2 |

PRELIMINARY COMPOSITE PROPERTIES

Although the processing used to manufacture the test panels was not necessarily optimized, the data presented above for each of the five systems is considered to be valid in comparison of the systems. The modified hardener shear properties seem to be similar to those of the standard hardener and the flexural properties, which are highly dependent on the fiber content, are also similar.

Matrix tensiles were run on all five systems. This test measures the combined effects of the resin matrix and shear properties of the composite. Such a measurement may be interpreted as an indication of toughness with increased strength and elongation to break being related to an increase in toughness. A real difference appears in this data, where all of the modified systems shown improvements over the control, but systems #1 and #3 appear to be the best.

Summarizing, it is seen that this invention provides novel, modified hardener systems for epoxy resins which exhibit excellent performance characteristics. Variations may be made in preparation, procedures, and materials without departing from the scope of the invention as defined by the following claims.

What is claimed is:

1. A hardener for polyfunctional epoxy resins comprising the adduct obtained from the reaction of a diamino diphenylsulfone corresponding to the formula

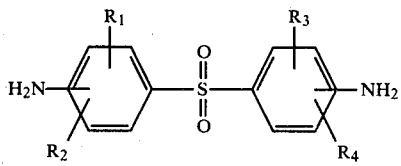

wherein $R_1$, $R_2$, $R_3$ and $R_4$ are independently hydrogen, straight and branched chain alkyl of 1 to 12 carbons or halogen,
and a diglycidyl ether of a polyhydric phenol; said hardener having from about 2.5 to 100 equivalents of aminohydrogen per equivalent of epoxy.

2. The hardener of claim 1, wherein said sulfone is diamino diphenyl sulfone.

3. The hardener of claim 1, wherein said diglycidyl ether is selected from the group consisting of diglycidyl ethers of bisphenols corresponding to the formula

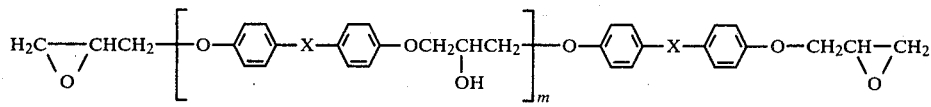

wherein m is 0–50 and X is —CH$_2$—,

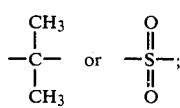

and the diglycidyl ethers of resorcinol, catechol and hydroquinone.

4. The hardener of claims 2 or 3, wherein said diglycidyl ether is the diglycidyl ether of bisphenol A.

5. A curable mixture comprising (a) a polyepoxide compound and (b) a hardener according to claims 1, 2 or 3.

6. The curable mixture of claim 5, wherein said hardener and said polyepoxide compound are present in stoichiometric amounts ±50%.

7. The curable mixture of claim 5, wherein said polyepoxide compound is selected from the group consisting of epoxide resins based on polyhydric phenols, hydantoin epoxide resins, polyglycidyl esters, glycidylated aromatic amines, glycidylated aminophenols and cycloaliphatic epoxy resins.

8. The curable mixture of claim 5 wherein said polyepoxide compound is tetraglycidylated methylene dianiline.

9. A curable mixture comprising (a) tetraglycidylated methylene dianiline and (b) a hardener comprising the reaction product of diamino diphenylsulfone and diglycidyl ether of bishpenol A; said hardener being present at 85% stoichiometry relative to said dianiline.

10. The product obtained by curing the mixture of claim 5 at elevated temperatures.

11. The product obtained by curing the mixture of claim 9 at elevated temperatures.

* * * * *